(12) United States Patent
Kubli et al.

(10) Patent No.: US 9,342,070 B2
(45) Date of Patent: May 17, 2016

(54) METHOD AND COMPUTING SYSTEM FOR DESIGNING A SHEET-METAL-FORMING PROCESS

(71) Applicant: AutoForm Engineering GmbH, Wilen (CH)

(72) Inventors: Waldemar Kubli, Neerach (CH); Matthias Pietsch, Zürich (CH); Silke Wagner, Zürich (CH)

(73) Assignee: Autoform Engineering GmbH, Wilen (CH)

( * ) Notice: Subject to any disclaimer, the term of this patent is extended or adjusted under 35 U.S.C. 154(b) by 376 days.

(21) Appl. No.: 13/906,363

(22) Filed: May 31, 2013

(65) Prior Publication Data

US 2014/0358268 A1    Dec. 4, 2014

(51) Int. Cl.
G05B 19/4093    (2006.01)

(52) U.S. Cl.
CPC .... *G05B 19/40937* (2013.01); *G05B 2219/35005* (2013.01); *G05B 2219/35188* (2013.01); *Y02P 90/265* (2015.11)

(58) Field of Classification Search
CPC ............. G05B 19/40937; G05B 2219/35188; G05B 2219/35005; G05B 19/4099; Y02P 90/265
USPC .......................................................... 700/97
See application file for complete search history.

(56) References Cited

U.S. PATENT DOCUMENTS

| | | | | |
|---|---|---|---|---|
| 5,868,020 | A * | 2/1999 | Delaney et al. | 72/21.3 |
| 5,886,897 | A * | 3/1999 | Hazama et al. | 700/182 |
| 6,219,586 | B1 * | 4/2001 | Sakai | 700/182 |
| 6,327,514 | B1 * | 12/2001 | Hazama et al. | 700/145 |
| 6,363,298 | B1 * | 3/2002 | Shin et al. | 700/160 |
| 6,525,745 | B1 * | 2/2003 | Phelan et al. | 345/676 |
| 7,885,722 | B2 | 2/2011 | Pietsch et al. | |
| 8,140,306 | B2 | 3/2012 | Kubli et al. | |
| 2002/0016647 | A1 * | 2/2002 | Bourne et al. | 700/165 |
| 2006/0106757 | A1 * | 5/2006 | Sakai et al. | 707/2 |
| 2007/0225847 | A1 * | 9/2007 | Pietsch et al. | 700/98 |
| 2008/0243442 | A1 * | 10/2008 | Kubli et al. | 703/1 |
| 2009/0192644 | A1 * | 7/2009 | Meyer et al. | 700/109 |
| 2010/0175013 | A1 * | 7/2010 | Krauter et al. | 715/771 |
| 2011/0169828 | A1 * | 7/2011 | Pedersen | 345/423 |
| 2013/0276503 | A1 * | 10/2013 | Bronnhuber et al. | 72/332 |

* cited by examiner

*Primary Examiner* — Carlos Ortiz Rodriguez
*Assistant Examiner* — Jason Lin
(74) *Attorney, Agent, or Firm* — Oppedahl Patent Law Firm LLC

(57) ABSTRACT

In a method for designing a sheet-metal-forming process in which a sheet-metal part is formed, a visual representation of the sheet-metal part is computed and displayed. Visual labels are displayed, each label being visually linked to the representation of a feature of the part. The labels indicate one or more processing units of the sheet-metal-forming process that are assigned to the features. The labels can also indicate process operations to which these processing units are assigned.

22 Claims, 8 Drawing Sheets
(7 of 8 Drawing Sheet(s) Filed in Color)

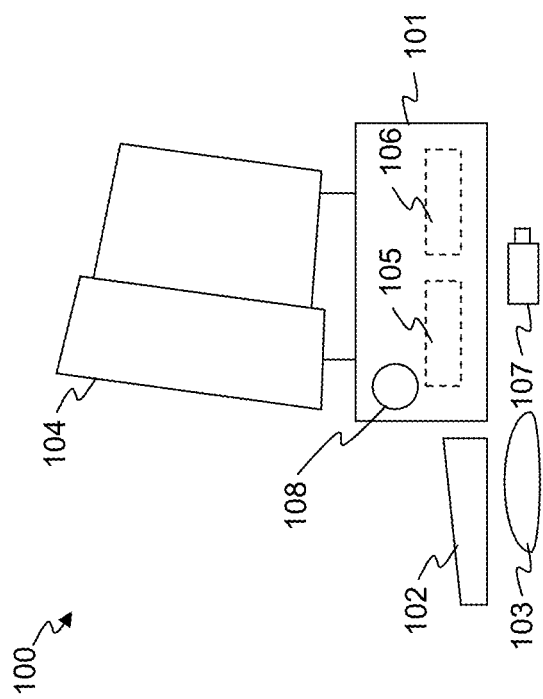

METHOD AND COMPUTING SYSTEM FOR DESIGNING A SHEET-METAL-FORMING PROCESS

FIELD OF ART

The invention relates to the field of computer aided design of sheet metal parts and of tools and processes for manufacturing such parts.

BACKGROUND

Sheet metal forming parts as a rule are manufactured by deep-drawing. The semi-finished parts, the so-called sheet metal blanks or billets, for this purpose are placed in multistage forming tools. By means of presses, in which the forming tools are mounted, the parts are formed. The parts as a rule are manufactured out of a flat sheet metal billet in several forming stages by means of processing stages such as drawing, restriking, flanging, etc., in combination with cutting stages.

The design and dimensioning of the forming tools is an iterative process, involving the modeling of the geometry of forming parts in different stages of the processing, and of corresponding tools. The term "geometry" in the present context stands for a (computer readable) representation of the geometrical dimensions of a body, for example, in the form of a finite elements grid, or of a quantity of parameterized elemental bodies and/or surfaces.

In this manner a process layout or method plan is developed, which among others describes a sequence of part geometries to be produced. The method plan or process layout as a rule also describes an allocation of individual forming operations to the part geometries.

U.S. Pat. No. 7,885,722 discloses a computer based method for generating a method plan for the manufacture of sheet-metal forming parts by way of forming processes in a series of (process) operations. The method involves the steps of determining a set of geometry features (hereinafter also just called "features") of a part in a geometry model of the part, wherein each of the geometry features is described by a feature type and by way of geometric parameters for describing the geometric shape of the geometry feature; and determining an associated method standard for each of the geometry features, wherein a method standard describes one variant for manufacturing the respective geometry feature, the selection of the method standards which may be associated with a certain geometry feature is dependent on the feature type of the geometry feature, and wherein a method standard comprises at least one module, and a module represents a processing unit and describes which machining unit may be implemented within an operation (or process operation).

U.S. Pat. No. 8,140,306 discloses a method in which so-called geometry operators associate a geometry of an area of a first geometry model with a geometry of an area of a second geometry model, and describe a transition from one of these two associated geometries to the other one. Each geometry operator can be associated with a (process) operation.

There is a need for providing a way for displaying and manipulating the relations between the entities involved in the definition of a method plan. There also is a need for efficiently assisting a user in the definition and iterative improvement of a method plan.

Many of the embodiments described herein are generally directed to a method and computing system for designing a sheet-metal-forming process of the type mentioned initially, which assists a user in creating a method plan for the manufacture of sheet-metal parts.

The following terms are used: parts are manufactured by way of forming presses, which may be implemented as single station presses (combined to form a tandem press line) or as a multiple station press, that is, a press with multiple stations (in a progressive tool or in a transfer tool). A press with multiple stations comprises several individual stations wherein several operations are accomplished with each press stroke. In each station and at each stroke of the press one or more manufacturing steps are effected on the part, after which the part is moved to the next station. Multiple station presses or dies can be of two types: progressive and transfer. With progressive dies, coil stock is fed into the press. Individual stampings are connected with a carrier strip as they progress through the various die operations and are ultimately separated and then discharged from the press. In transfer die operations individual stock blanks are mechanically moved from die station to die station within a single die set.

Each stroke of a single, separate press in a tandem press line shall be called one operation (or process operation) of the press on the part. In the case of a press with multiple stations, one stroke of the press shall be defined to comprise one process operation per station. In other words, the term "process operation" stands for one stroke of a single station press or for one stroke of the press in one station of a multiple station press. A process operation comprises the manufacturing steps effected on the part in one station, after it is moved into the station and before it is moved out of the station.

One process operation comprises one or more manufacturing steps effected on the part. Typically, manufacturing steps are associated with and assigned to a feature of the finished part, and one or more manufacturing steps are needed to manufacture a particular feature.

From the point of view of the part, a feature is manufactured by a manufacturing sequence of individual manufacturing steps. Those manufacturing steps for a feature which are carried out in the same station, that is, in the same process operation, shall hereinafter be called a processing unit, or simply a "module". As described in abovementioned U.S. Pat. No. 7,885,722, features can be manufactured in different ways, that is, using different modules or combinations of modules. For example, a feature created by cutting and punching can be manufactured by two separate modules, one module comprising one manufacturing step "cutting" and the other module comprising one manufacturing step "punching". Alternatively, the feature can be manufactured by a single module that comprises one manufacturing step "cutting" and another manufacturing step "punching", executed in the same process operation. The physical realization of a processing unit is done by a tool. The term "tool" on the one hand can refer to typically a punch and die as a whole, and also—depending on context—a region or a particular component of the punch and die that are involved in shaping a particular feature. Such a "local" tool can be, for example, a piercing punch, piercing die, trim steel, flanging steel, etc. . . . .

When the present application mentions a processing unit being assigned to a tool, this usually means that the processing unit is assigned to such a "local" tool. For example, several processing units that each correspond to the piercing of a hole can be assigned to a single cam. Then the cam including all necessary components is the tool that manufactures these several holes in one process operation.

Regions on the part which typically are manufactured after the deep drawing in further operations, have geometric properties which differentiate them from the rest of the geometry. Such regions, are herein called geometry features or simply features, They can be, for example, of one of the following feature types: holes, openings, punchings (piercings), backdrafted (undercut) regions, flanges, postforming regions, edge regions etc. Features can also be shaped in the deep drawing operation.

A working direction is a direction in 3D space in which a tool moves. The working direction can be represented by a vector in 3D space. The tool typically is a punch or a cam. A working angle is an angle at which a tool meets the part. Working angles are usually classified as shear angle, trim angle, and backdraft angle. Working angles are defined relative to a working direction. In the design phase, working directions can be used that do not correspond to a specific tool (because the tool has not yet been selected or defined). A working direction that serves as a reference for one or more working angles can be called a reference working direction.

An important part of a method plan is the association of processing units with process operations. Each processing unit is assigned to exactly one process operation, and each process operation is thus associated with one or more processing units. This association determines which tools (determined from the processing unit) are required in each operation. Since each process operation corresponds to one press or to one station in a press, this association is needed to configure the press or station. Conversely, such a configuration needs to be checked whether it is feasible. If it is not, the association can be changed, that is, the processing units can be assigned to the operations in a different manner. This can lead to an iterative optimization process, with one of possibly several optimization goals being the minimization of the number of operations.

SUMMARY OF THE DISCLOSURE

In a method for designing a sheet-metal-forming process in which a sheet-metal part is formed, performed by a processor of a computing system, by means of:
- the processor determining, from the model of the geometry of the sheet-metal part, a visual representation of the sheet-metal part, and displaying this visual representation on a display device operatively coupled to the processor;
- the processor maintaining a computer based representation of process operations and processing units, wherein a process operation represents (essentially all the) manufacturing steps effected on the part by one stroke of the forming press in a single station press or in one station of a multiple station press and wherein a processing unit represents one or more manufacturing steps that are assigned to one feature of the part and that are carried out in the same process operation;

a method is performed for assisting the user in managing an assignment from processing units to process operations, the method comprising the steps of:
- the processor, based on user input, determining one or more of the features as selected features;
- the processor computing and displaying on the display device feature markers, the feature markers preferably being visual elements, indicating the location of the selected features on the sheet-metal part; that is, at their location on the visual representation of the part;
- the processor computing and displaying on the display device one or more visual labels, a label being a visual representation of (one or more) processing units that are assigned to the selected features, each label being visually assigned to (or related to or associated with) the feature marker of the selected feature to which the label is assigned.

As one or more processing units can be assigned to a particular feature, each feature is thereby associated with one or more processing units. The visual representation of these processing units with the visual connection to the associated features allows for an efficient representation of the processing units involved in manufacturing the part, while reducing the screen area needed therefore (as opposed, e.g. to a table listing process operations and processing units).

Furthermore, this visual representation by such labels gives an easy to grasp overview over the features and the processing units assigned to them, and further allows for easy and fast editing of the processing units.

The selected features can be all the features that are visible in the visual representation of the sheet-metal part. This visual representation depends on user input as a user rotates and zooms in and out of a view of the sheet-metal part, and correspondingly the features that are displayed also depend on user input. A user could also select and deselect features individually.

A feature marker can be implemented by coloring the visual representation of a feature different than the main area of the part. The color used can be chosen to identify a process operation used to shape the feature, in particular the main or the first process operation that gives the feature its basic shape. The color can also be used to identify the feature type.

In an embodiment, the labels are visually assigned to the feature marker of the selected feature to which the label is assigned by connecting elements that visually connect the labels with the corresponding feature markers.

In an embodiment, the connecting elements are lines connecting the labels to the corresponding feature markers. The lines can be straight or curved. The lines give an easy to grasp visual link from features to processing units. The labels can be arranged in the vicinity of the features they are assigned to, keeping lines short and avoiding cluttering of the screen.

In another embodiment, the visual link between the feature markers and corresponding labels is realized by arranging the labels in the vicinity of the corresponding feature markers. For example, each label is placed closest to the feature marker to which it is assigned (and not closer to any other marker). Thus, the visual link can be realized without drawing any lines between the feature markers and the associated labels.

In an embodiment, a label comprises one or more label elements, each label element corresponding to one of the processing units represented by the label. The label elements can be visually arranged according to the order of the processing units when manufacturing the part. For example, this can be, following the temporal order in which the processing units are executed, from left to right, top to bottom, in a simulated 3D view ("cover flow"), etc.

In an embodiment, the label elements comprise a symbolic or textual representation corresponding to one of the processing units represented by the label. This allows for a quick visual overview of the processing units involved in the manufacturing of the part.

In an embodiment, at least one of a label or a feature marker comprises a visual representation of the process operation(s) to which the processing unit(s) represented by the label is(/ are) assigned to. In addition, the label can comprise a visual representation of this assignment. This results in the labels showing the association between the process operations and processing units, e.g. which process operation each processing unit shown in the label is assigned to. The association can be shown, e.g. by coloring a label element or its frame or a mark assigned to the label element and placed near the label element with a color representing the process operation. Alternatively or in addition, the association can be shown by displaying on the label a string or icon that stands for a process operation, and by placing the label elements to be visually associated with this string or icon. This allows for a quick and easy overview of just the processing units related to the associated feature, and to their relation to the process operations.

In an embodiment, a label comprises, in addition, a visual representation of further process operations for manufacturing the part, to which further process operations the processing unit represented by the label is not assigned. Label elements corresponding to processing units are placed to indicate which process operation each processing units is assigned to. Thus, some of the process operations may have no processing units assigned to them. In an embodiment, not all process operations are represented as further process operations; that is, process operations that do not allow for processing units being assigned to them can be omitted. For example, an initial deep drawing or an initial blanking step can be omitted. This gives, for each feature, an overview of the processing units in the complete context of all relevant process operations. In a further embodiment, this can allow for editing of the assignment of processing units to process operations, for example by drag and drop or by moving the label elements from one process operation to the other one by the arrow keys.

In a variant of a drag and drop operation, prior to the drag and drop operation only the set of process operations that are already used for the feature is displayed in the label. When the drag and drop operation is initiated by the user, for example, after the user has begun to drag the label element corresponding to a processing unit, then the system automatically, or triggered by a user input such as the user pressing a modifier key, expands the contents of the label to show more process operations onto which the label element can be dropped (i.e. to which the processing unit can be assigned). After the label element has been dropped, the system can again collapse the label to show only the set of process operations in use for the feature (which can differ from the set initially displayed).

In a further embodiment, the set of further process operations, in a label assigned to a particular feature, can be limited to process operations that have working directions with which at least one of the processing units for the feature can be executed. The working direction in this case can be the working direction of the upper die that is already defined for the process operation. Resulting combinations of processing units and process operations that are not compatible can be visually marked (e.g. by giving a corresponding field in a matrix representation a special color).

In an embodiment, the visual representation of the process operations and label elements are displayed in a grid arrangement, and the visual representation of the process operations and the label elements of processing units assigned to these process operations are placed in the same row or column of the grid arrangement. This gives an efficient overview of the relevant processing units related to one particular feature or group of features.

If the visual representation of the process operations is done, as explained further up, by coloring a label element or its frame or a mark assigned to the label element, then the process operations in the same row or column are coloured in the same manner. If the visual representation of the process operations is done, as explained further up, by a string or an icon that stands for a process operation, then this string or icon can be placed in a header or footer row or column.

In an embodiment, the step is performed of changing which process operation a processing unit is assigned to based on user input by the user graphically manipulating the label/interacting with the label. Manipulation of the label can comprise a drag and drop operation, such as dragging the label element that represents a processing unit and dropping it on an icon or on an area of the label that represents a process operation. Interacting with the label can comprise opening a context menu of a label element and selecting a menu entry corresponding to a process operation. The context menu can show process operations that are currently not used for the feature (that is, further process operations as mentioned in one of the preceding paragraphs). This allows for easy manipulation of a processing unit's assignment, within the local context of a label.

In other words, the steps can be performed of the user performing a drag and drop operation by dragging a label element corresponding to the processing unit to a screen location corresponding to the process operation to which the processing unit is to be assigned, and assigning the process unit to this process operation accordingly.

In other words, the steps can be performed of, upon the user activating a context menu for a label element corresponding to the processing unit, the computer displaying in the context menu several indications of process operations, and, upon the user selecting one of these indications, assigning the process unit to this process operation according to the selection.

In an embodiment, the step is performed of computing and displaying, for the one or more selected features, or for one or more processing units assigned to those features, a graphical or textual representation of evaluation criteria. An evaluation criterion is usually based on an evaluation value. Each evaluation criterion (and optionally a corresponding evaluation value) can be assigned to one of the selected features. An evaluation criterion (and optionally a corresponding evaluation criterion) can also be assigned to a group or bundle of several features, as described further down.

The evaluation value can be a scalar or a multi-dimensional value. The evaluation criterion can be the evaluation value itself, or a graphical or textual representation of the evaluation value. The evaluation criterion can also be the result of a comparison of the evaluation value with one or more threshold values. For example, if the evaluation value is a working angle, then the evaluation criterion can be a graphical representation of the working angle, and/or it can be a boolean value giving an indication whether the working angle lies within a given range. For the various evaluation criteria, associated threshold values can be user defined or be stored as part default settings in the software implementing the invention. Evaluation criteria can be based on, for example, one or more of:

working angles (such as trim angle, shear angle and backdraft angle) with reference to a given reference working direction. The given reference working direction may be one selected by the user, the one currently assigned to the processing unit resp. to one of the processing units, or one determined by the computer (e.g. an average direction in case of more than one processing units). E.g. a "traffic light" (a visual indicator indicating different statuses) as part of a label element may indicate if the according processing unit is feasible for a given reference working direction, i.e. if the selected feature can be trimmed or formed from the given reference working direction. This allows to assess whether processing units can be combined to be executed by the same die or cam.

Optionally, a working angle plot for the one or more selected features can be computed and displayed.

dimensional deviations with respect to given tolerances for the selected features assuming that the feature is manufactured with a specific working direction. E.g. a traffic light as part of a label element can indicate if the according processing unit is feasible for a specific working direction, i.e. if the selected feature can be trimmed or formed from the specific direction fulfilling the required tolerances. This allows for a more precise assessment of the same kind if at least one tool is defined, an indication whether a processing unit for the one or more selected features can be realized with the working direction of one of the tools that is already defined. This assists the user in evaluating his/her options in re-assigning the processing units. It can also help to reduce the number of cams involved.

for two or more selected features, testing at least one of whether distances between the selected features are lower than a lower boundary value or whether distances between the selected features are higher than a higher boundary value. The distance can be the Euclidean distance between features or boundaries of the features. Problems can arise—and should be reflected in such an evaluation criterion—if the features are too close to each other and thus the tools can collide or be incompatible, or if the features are supposed to be manufactured with the same tool but are too far away from each other. This can thus assist a user in assessing whether combining the processing units for the selected features to be manufactured by the same tool is advisable.

for at least one or for each of the features and for at least one of the process operations to which a processing unit for that feature is assigned, a space used by all the tools required in this process operation for manufacturing the features.

for at least one or for each of the features and for at least one of the process operations to which a processing unit for that feature is assigned, a required energy required for executing that processing unit.

for at least one or for each of the selected features and for at least one of the process operations to which a processing unit for that feature is assigned, a required press force required for executing that processing unit. Since each processing unit is assigned to one process operation, the sum of all required press forces for all processing units that are assigned to a process operation gives the total press force required for this process operation. In a single station press, this sum is not allowed to exceed a rated press force of the press. In a multiple station press, the sum of required press forces over all process operations and over all stations is not allowed to exceed a rated press force of the press. In evaluation of the sum of all required press forces, a temporal distribution of press forces (that is, the distribution of press forces over time) in a process operation can be taken into account. Then, if manufacturing steps take place at different times during the movement of the press, they can be performed even if the sum of their forces exceeds the rated force of the press.

a spatial distribution of press forces in a process operation. The forces acting on the press should ideally be evenly distributed over the tool as a whole, be it in a single station press or in a multiple station press. This can be tested for, and it can be indicated if an uneven spatial distribution occurs. For example, an uneven distribution can be indicated if the center of the forces is distanced from the center of the press by more than a threshold, and the sum of forces also exceeds a further threshold.

a tool cost for processing units assigned to the one or more selected features. Tool costs can be computed, e.g. as described in abovementioned U.S. Pat. No. 7,885,722.

In summary, typically some evaluation criteria are functions that return boolean values, others are functions that return scalar or vector values.

A boolean value indicates whether an evaluation criterion is satisfied. If and only if it is satisfied, then the processing unit, with the parameters under which the criterion was evaluated, can be used for manufacturing the feature.

A scalar or vector value indicates how "good" or desirable the result provided by applying the processing unit with the parameters under which the criterion was evaluated is. Scalar or vector values from one or more processing units can be combined in a target function or optimization goal. An optimisiation function can be applied to find parameters—in particular working directions—which optimise such a target function. Optimising can mean minimising or maximising the function, depending on how it is defined.

In an embodiment, the step is performed of computing and displaying, for the one or more selected features, a graphical or textual representation of a progress status assigned to the feature, the progress status indicating at least whether the feature still needs to be worked on or not, e.g. by the user editing parameters of the feature or of the processing units assigned to the feature. This allows to give a visual overview, based on the visual representation of the part and directly linked thereto, of where work is required, and for which areas of the part the design of the method plan can be considered to be ready.

In a further embodiment, information related to the handling of excess or scrap material is computed and/or retrieved and then is displayed or output in another manner. This can be a visual representation (in 2 or 3 dimensions) of chutes under the die for collecting such scrap material, allowing a visual check whether they match the placement of the tools or the features.

In a further embodiment, a measure of a complexity of the process operation is computed and is displayed or output in another manner. This can, for example, be based on or be identical to at least one of the number of tools, the number of cams, the number of undercuts, the number of difficult to reach holes, a combination of two or more of the preceding numbers, etc.

In an embodiment, the processor, based on user input, can determine two or more of the features to constitute a group of features. A group of features can also be called a bundle. Such grouping allows to compute and/or display properties of a group as a whole, e.g. a required press force, a label representing all the elements of the group. etc. This grouping also allows to manipulate the elements of the group together, e.g. assigning processing units of the grouped elements to the same process operation, assigning processing units of the grouped elements to the same tool, computing and evaluating evaluation criteria that can be summarised to apply to a group, etc.

A group of features can be created on an ad hoc basis or temporarily, and be discarded again, without permanently storing information related to the group. A group can also be created and stored for later retrieval and/or be assigned a unique identifier. In the latter case, a group can also be called a "bundle".

In an embodiment, the method comprises the steps of
the processor, based on user input, determining two or more of the features to constitute a group of features;
the processor, based on user input, computing and displaying a label that is assigned to the group of features and comprises a visual representation of the set of the processing units that are assigned to all of the features of the group of features.

In order to visually show which members the group comprises, a group connecting element can be displayed, which visually relates or connects the members of the group of features. Such group connecting elements can, for example, be implemented by coloring the feature markers of the members of the group in the same way, and/or by drawing lines connecting these feature markers, and/or by drawing lines around these feature markers.

In an embodiment, the method comprises the steps of
the processor, based on user input, determining two or more of the features to constitute a group of features;
the processor, based on user input, and for a process operation selected by the user, assigning the same tool to all of the processing units within the same process operation and assigned to said features.

In other words, the processing units that are re-assigned are those that are assigned to the features of the group of features and are also assigned to said same process operation.

In an embodiment, the method comprises the steps of
the processor, based on user input, determining two or more of the features to constitute a group of features;
the processor, computing and displaying a working angle plot for the features of the group of features, the working angle plot being a visual representation of the threshold analysis of all working angles with respect to all working directions.

In an embodiment, the method comprises the steps of
the processor, based on user input, determining two or more of the features to constitute a group of features (as already stated, such a group can represent on the one hand a temporary grouping or on the other hand a permanently stored grouping or "bundle");
the processor, computing and displaying one or more summary data items for a group of features, a summary data item being a combination of parameters or of evaluation criteria from these features or from the processing units assigned to said features.

Such a summary data item can be for example
a sum of costs for manufacturing the tools for the processing units.
a logical combination of progress statuses of the processing units. For example, if at least one of the processing units is in the status "not OK", then the group is also assigned the status "not OK".
for at least one process operation, the space used by all the tools required in this process operation for manufacturing the group of features.
a sum of required energies required for executing the tools of the processing units for a group of features.

In an embodiment, the summary data item is a group press force, and the method comprises the steps of
the processor, based on user input, determining two or more of the features to constitute a group of features;
the processor, computing and displaying a group press force for the features of the group of features, the group press force being the sum of required press forces required for the processing units within the same process operation and assigned to said features.

Doing so for several groups allows to compare group press forces over the entire part and assess the distribution of forces over the press. If the distribution is seen to be uneven, the design can be changed iteratively. Press forces can be displayed numerically and/or graphically, e.g. as a bar plot. Bars can be placed near the features or groups of features whose force they represent.

The method and system can interact with a user when designing a sheet-metal-forming process according to one or more of the use cases corresponding to the following sequences of method steps:

Combining processing units by assigning them to the same tool:
the system accepting a user input that selects a first processing unit;
the system presenting to the user one or more other processing units that can be manufactured with the same tool as the first processing unit. This step can take into account evaluation criteria. Such evaluation criteria can be manufacturing tolerances, limits for working angles, distances between features to which the processing units are assigned, etc. In doing so, the system can determine, given a working direction associated with the first processing unit, the evaluation values for other processing units and compare them to corresponding boundary or threshold values. If the evaluation criteria for a processing unit are satisfied, it is included in the list of processing units presented to the user. This list represents processing units that are compatible with the first processing unit.
As an optional step: the system accepting a user input that specifies one or more of the processing units that were presented to be assigned to the same group. The group can, in the same step or in a later step, be assigned to one tool which thereby is defined to be a tool for manufacturing all the processing units of the group.

Find working direction for several processing units:
the system accepting a user input that selects two or more processing units;
the system presenting to the user one or more working directions with which these selected processing units can be manufactured. This step can take into account evaluation criteria, as described above. In doing so, the system can determine a working direction for which the evaluation criteria for all the selected processing unit are at least satisfied or return an optimal value. This step can be accomplished by a multivariate optimisation process having, boundary conditions and/or a target function to be minimised that are based on the evaluation criteria.
if there is no solution that satisfies all evaluation criteria, the system presenting to the user a subset of the selected processing units that does satisfy the evaluation criteria. Preferably, this subset is as large as possible.

Find processing units for a given working direction:
the system accepting a user input that defines a working direction;
the system presenting to the user one or more other processing units that can be manufactured with this working direction. This step can take into account evaluation criteria. Such evaluation criteria can be manufacturing tolerances, limits for working angles, distances between features to which the processing units are assigned, etc. In doing so, the system can determine, given the working direction, the evaluation values for several or all processing units and compare them to corresponding boundary or threshold values. If the evaluation criteria for a processing unit are satisfied, it is included in the list of processing units presented to the user. This list represents processing units that are compatible with the working direction.

As an optional step: the system accepting a user input that specifies one or more of the processing units that were presented to be assigned to the same group. The group can, in the same step or in a later step, be assigned to one tool which thereby is defined to be a tool for manufacturing all the processing units of the group.

In each of the above use cases, a simple variant uses only the working angles as an evaluation criterion. The evaluation criterion is satisfied for a processing unit if, given a working direction, the resulting working angles for the processing unit lie within limits specified for the corresponding feature.

In an embodiment, the computer program for designing a sheet-metal-forming process is loadable into an internal memory of a digital computer or a computer system, and comprises computer-executable instructions to cause one or more processors of the computer or computer system execute the method. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims.

BRIEF DESCRIPTION OF THE DRAWING

The patent or application file contains at least one drawing executed in color. Copies of this patent or patent application publication with color drawing(s) will be provided by the Office upon request and payment of the necessary fee.

The subject matter of the invention will be explained in more detail in the following text with reference to exemplary embodiments which are illustrated in the attached drawings, in which:

FIG. 8 shows a computer for carrying out the method of the invention.

The reference symbols used in the drawings, and their meanings, are listed in summary form in the list of reference symbols. In principle, identical elements are provided with the same reference symbols in the figures.

DETAILED DESCRIPTION

Figure 1:
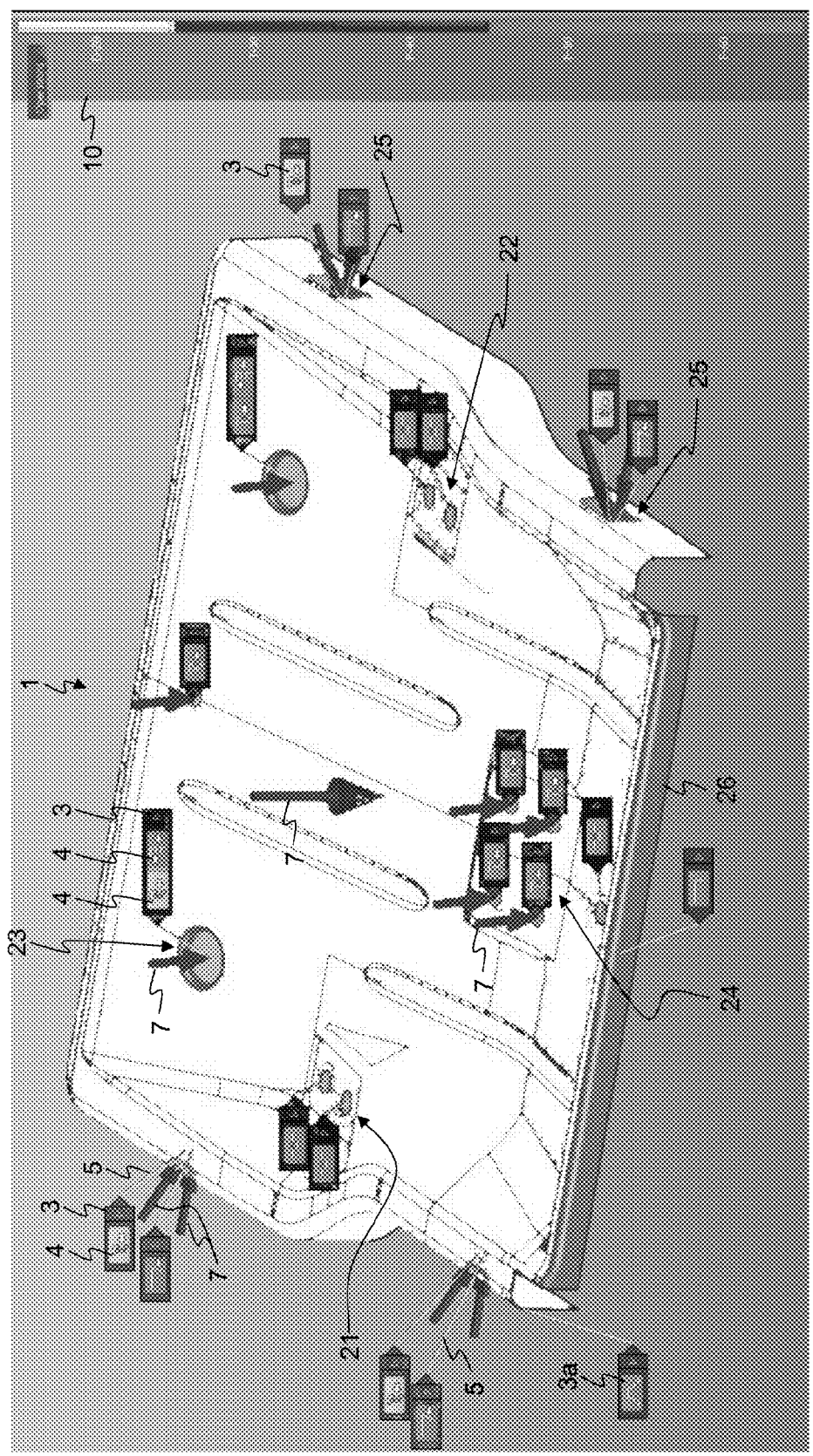
FIG. 1 shows a computer generated visual representation of a formed metal part, with features being highlighted and with labels showing processing units that are assigned to the features.

FIG. 1 shows a computer generated visual representation of a formed metal part 1, with features 21, 22, 23, 24, 25, 26 highlighted, e.g. in a different color, and with labels 3 comprising label elements 4 that represent processing units that are assigned to the features 21, 22, 23, 24, 25, 26. Depending on the complexity of a particular feature, there can be more than one processing unit and accordingly also more than one label element 4 assigned to the feature. The label elements 4 can comprise a visual representation or an icon that represents the corresponding processing unit. A progress status assigned to a processing unit can be indicated, e.g. by a background color of the icon. In the present example, a light background indicates that work on the processing unit is not yet finished. In a more general example, different states may be indicated, e.g. by different background colors of the icon. Such different states can be "not ok"—the processing unit does not fulfill conditions on one or more evaluation criteria;

"critical"—at least one evaluation criterion has a value that lies in a critical range; and "ok"—no further work on the processing unit is required.

For the "not ok" and "critical" states, the user should edit parameters of the processing unit and/or of the corresponding feature. Editing the parameters of the processing unit can comprise changing the assignment of the processing unit to a process operation or to a particular tool. Editing the parameters of the processing unit can also comprise editing parameters of a tool that is shared by several processing units. For example, this can be the working direction of a die or cam that affects several features. For the "critical" state, the user can also assess the situation, judge it to be acceptable, and manually set the state to "ok". Editing the parameters of the processing unit can also comprise editing parameters of a feature, from which parameters of the processing unit depend.

The labels 3 can be visually associated with corresponding features, e.g. as shown by connecting lines 5 connecting the labels 3 and feature markers. In FIG. 1, each feature is shown to be associated with one label 3. The feature markers can be simply the visual representation of the features as elements of the visual representation of a formed metal part 1. Features can be made easier to identify by, for example, a coloring (or hatching) that differs from the coloring (or hatching) of the bulk or the remainder of the part 1. In the present example, most of the part is colored with a color corresponding to an initial deep-drawing operation which gives the part its overall shape.

Working directions 7 are represented by arrows. A working direction can be the direction of movement of a die relative to the part 1, i.e. of the main tool forming the part in one process operation, or the direction of movement of a cam, i.e. of an additional tool that moves during the process operation and usually moves in another direction than the main tool, but is synchronized with the main tool.

The arrows can be visually marked, by their shape and/or their color, to reflect different types of processing units. Such different types can be drawing, flanging, piercing and trimming. In FIG. 1, a central arrow indicates the working direction of a press, while the remaining arrows indicate the working directions of cams for piercing and flanging.

A color code indication 10 can show colors assigned to process operations. Then features of the part 1 can be colored according to the process operation in which they are formed. If processing units for the feature are distributed over several process operations, then the color of the feature can be chosen to be the color of the first operation in which the feature has a processing unit.

For the purpose of the present explanation, a number of features is singled out:

A first hole pair 21 in the left half of the part 1 as shown and a second hole pair 22 in the right half. Each hole is shown to be manufactured by a single piercing step.

A large hole with extrusion 23, shown to be manufactured by two processing units: first a piercing using a cam and then an extruding using a cam and filler. This "hole with extrusion" is considered to be a single feature. In the present example, the piercing processing unit is shown to have a critical status, and the extrusion is shown to have an OK status.

A hole quartet 24. Each hole is shown to be manufactured by a piercing using a cam.

A side flange hole 25 with a tab (a small flange at one side of the hole), shown to be manufactured by two processing units: first by a piercing using a cam (creating the hole) and then a flanging using a cam (creating the tab). The side "flange hole" and "tab" are considered to be two different features (This is different from the above-mentioned "hole with extrusion" 23. Such different representation can be chosen by the user according to circumstances, as shown in U.S. Pat. No. 7,885,722 already mentioned). The piercing is shown to have a critical status.

A front flange 26, shown to be manufactured by a simple flanging operation.

The border of the part is associated with a trimming operation, symbolized by a corresponding icon on a label 3a connected to the border of the part.

In FIG. 1, each feature, e.g. each hole is treated as a single element and has its own label assigned to it.

Figure 2:
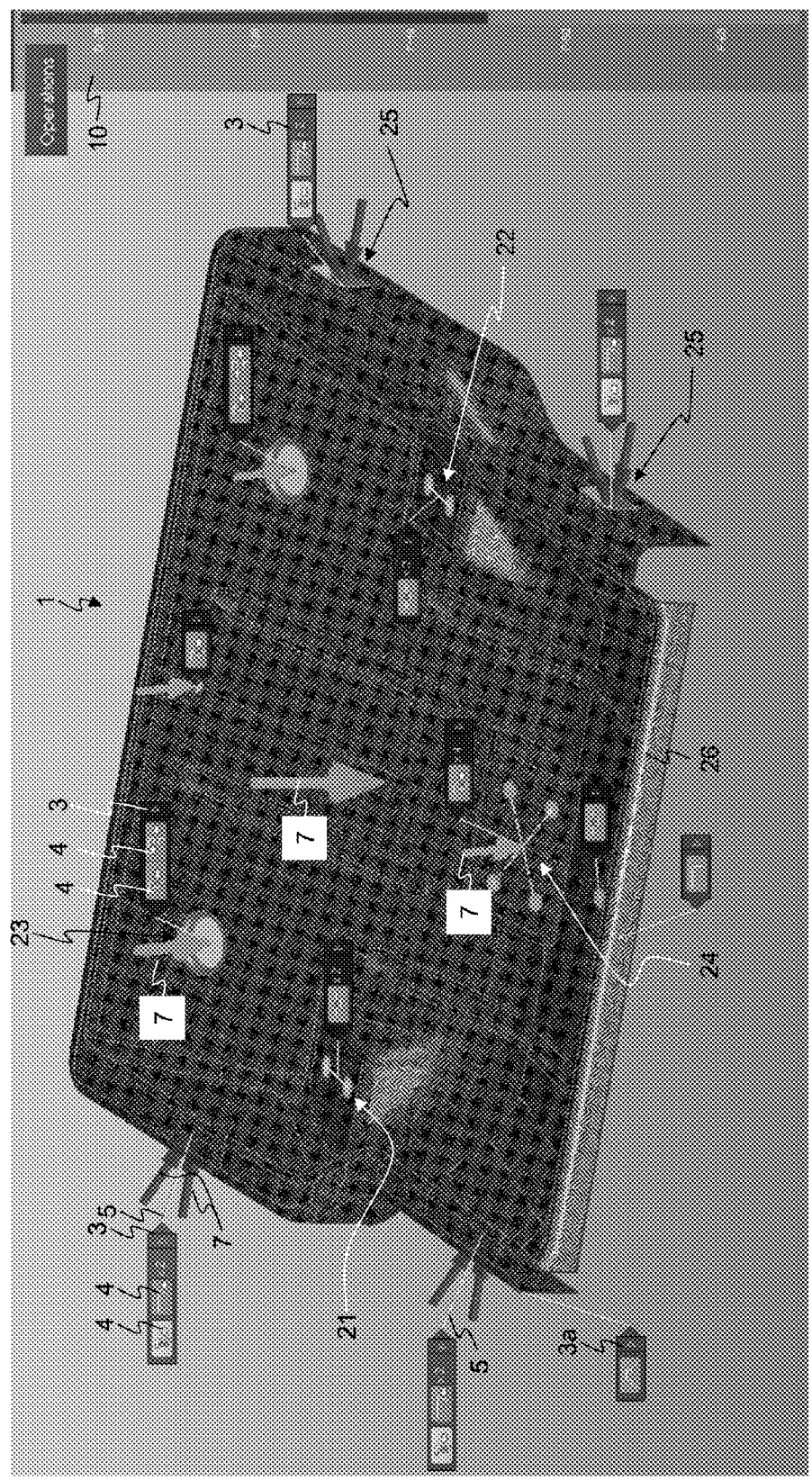
FIG. 2 is similar to FIG. 1, but has labels assigned to groups of features.

FIG. 2 is similar to FIG. 1, but has labels assigned to groups of features. In the present example, a group is also called a "bundle". The holes of first hole pair 21 are grouped together, and a single label 3 is graphically associated with the group. The grouping is visually represented by a line connecting the elements of the group. The graphical association of the single label 3 is effected by connecting the single label to the line that represents the grouping. The grouping can of course be represented in different ways, e.g. by coloring the members of a group in the same way, by drawing a line around the group, etc.

Similarly, the second hole pair 22 and the hole quartet 24 each are grouped. In these groupings, features of a similar kind (the holes) and located in different places are grouped. The features of the group can be manufactured in the same process operation.

The side flange hole 25 now also is represented by a group. In this grouping, the group comprises features that are manufactured in different process operations. An indicator (in the present case a text element "x2") can be used to indicate that the group represents two features.

The grouping makes the display less cluttered and groups features and/or processing units that are related in that they can be manufactured in the same way or in that they are part of the same complex feature, such as in the case of the side flange hole 25.

Figure 3:
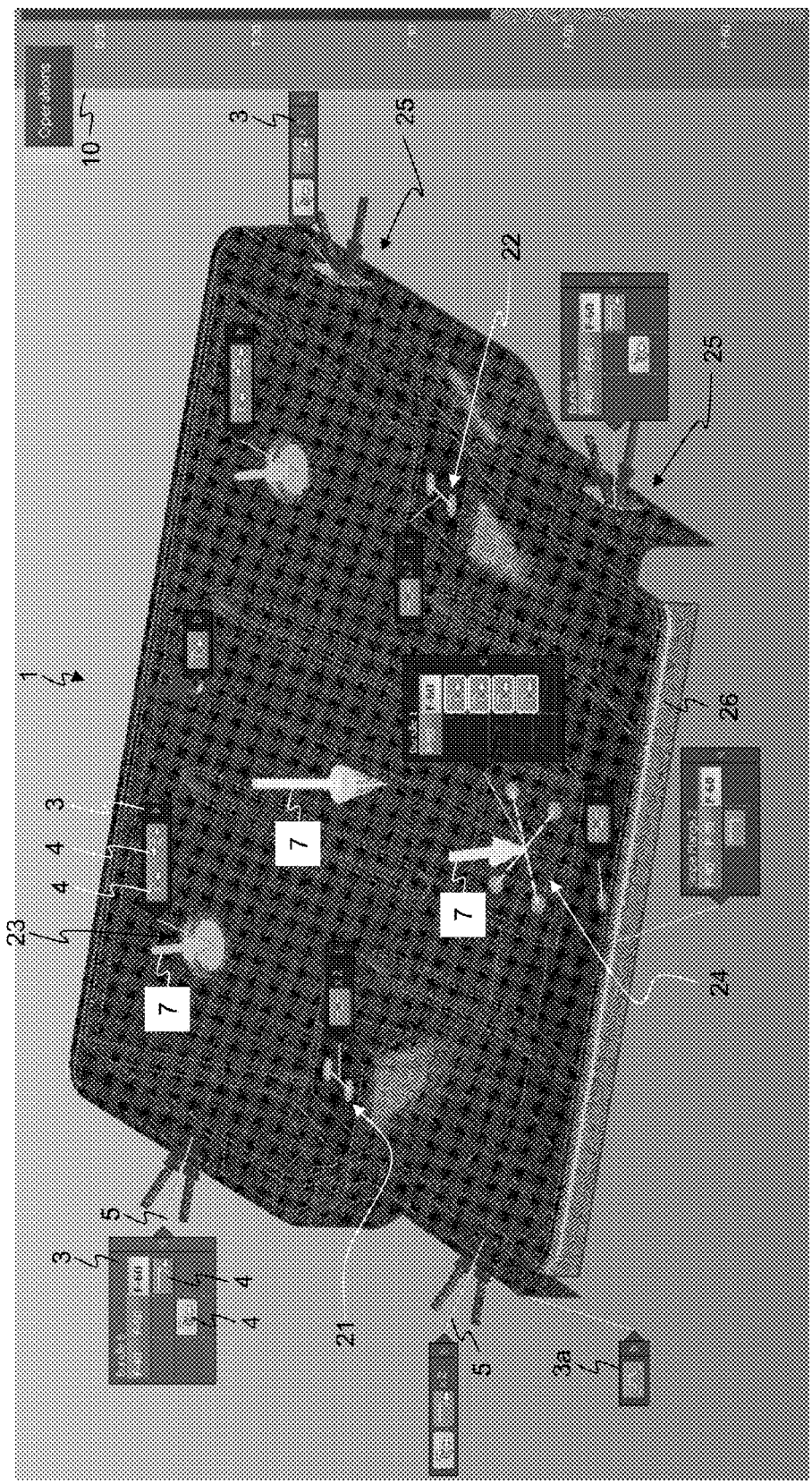
FIG. 3 is similar to the preceding figures, but shows the labels in an expanded configuration, showing process operations to which the processing units are assigned.

FIG. 3 is similar to the preceding figures, but shows some labels in an expanded configuration, showing process operations to which the processing units are assigned.

For example, a group "Bundle 4" (and similarly "Bundle 6") associated with a side flange hole 25 is shown to comprise two features, each assigned to one row in a grid arrangement of the label; and the corresponding two processing units already mentioned above, each processing unit being represented by a label element. The label elements 4 are placed in the grid arrangement according to the process operations to which the processing units are assigned, each column corresponding to one process operation, indicated in the head of the column. Thus, the piercing using a cam is assigned to process operation F-50 and the flanging using a cam is assigned to process operation F-60.

The expanded label also shows a process operation F-40, to which currently no label element 4 of this label is assigned. In an embodiment, the assignment can be changed by the user selecting and dragging a label element 4 from its present process operation to another process operation.

As another example, a group "Bundle 1" associated with the hole quartet 24 is shown to comprise four features, each corresponding to one row in the grid arrangement. Each feature is implemented by a processing unit comprising a piercing using a cam. All four processing units are assigned to the same process operation F-60, as can be seen by the placement of the corresponding label elements in the column associated with operation F-60. A further process operation F-50 to which no processing unit is assigned is also shown.

As another example, an expanded label "Simple Flange 2" associated with the front flange 26 feature shows that this single feature is realized by a single processing unit which in turn is associated with process operation F-50.

This possibility to expand labels allows to provide and optionally also manipulate information and parameters related to features that currently are of interest to the user, while leaving the labels 3 for other features collapsed, reducing visual information overload for the user and keeping the representation less cluttered. Also, less screen area is used by expanding only selected labels 3.

Figure 4:
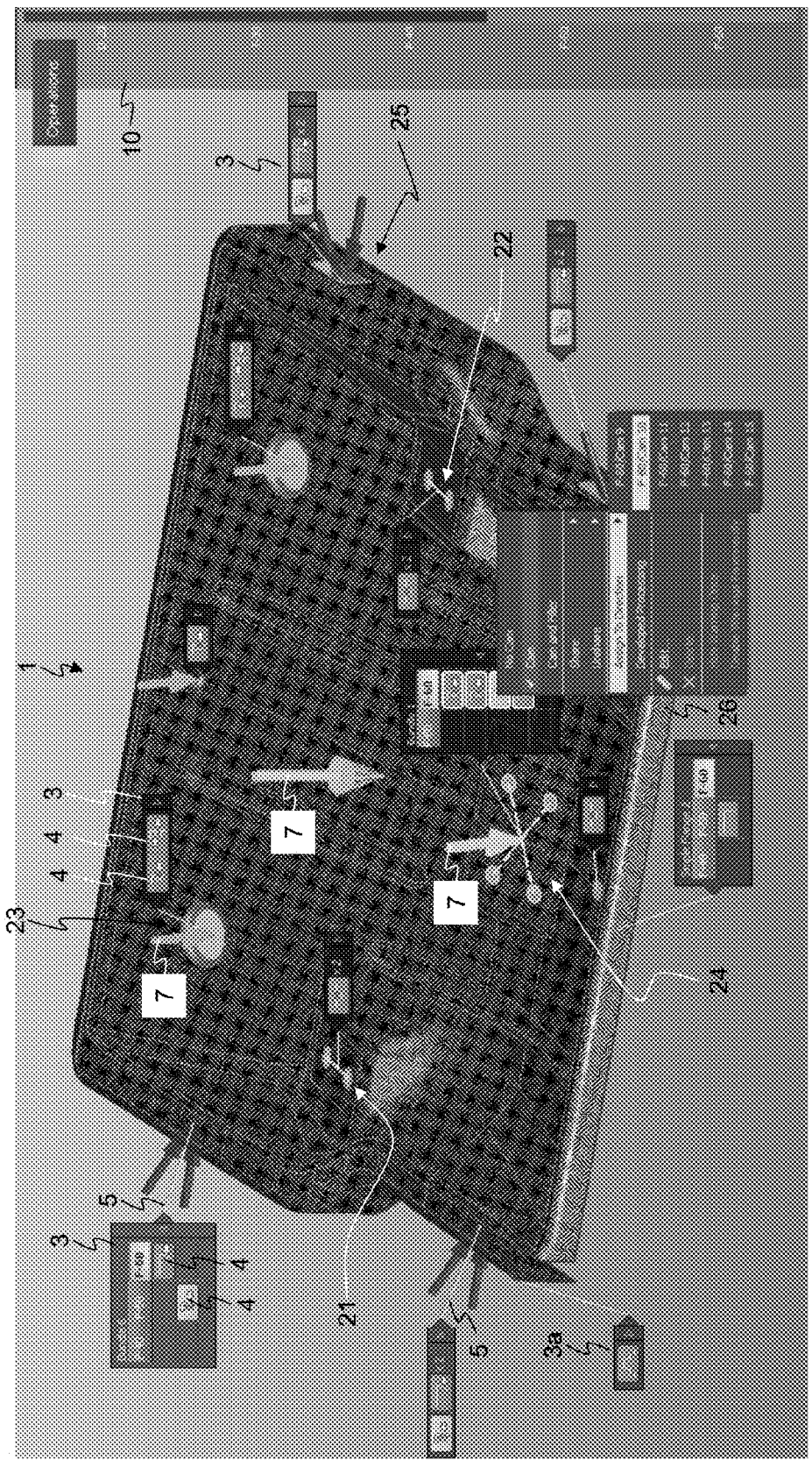
FIG. 4 is similar to FIG. 3, and shows a context menu for one of the labels.

FIG. 4 is similar to FIG. 3, and shows a context menu for one of the processing units of the group "Bundle 1". The context menu allows, among others, to modify the type of the processing unit. In the present example, the type can be "No Cam", "Cam, "Cam and Filler".

to assign the processing unit to one of several directions. As explained above, a direction is the working direction of a press or of a cam within the press, and therefore assigning the processing unit to a particular direction is essentially the same as assigning the processing unit to the upper die of a particular process operation or to a particular cam of a process operation (as in the selection "F-60/Cam 10" shown in the example).

Another option for a context menu (not shown) is to activate a graphic user interface element that allows to modify the working direction of the tool, that is, of the die or the cam that is associated with the processing unit. The user interface element can be implemented, for example, by a projection of two or three axes and/or by sliders and/or by input fields for numerical values.

Figure 5:
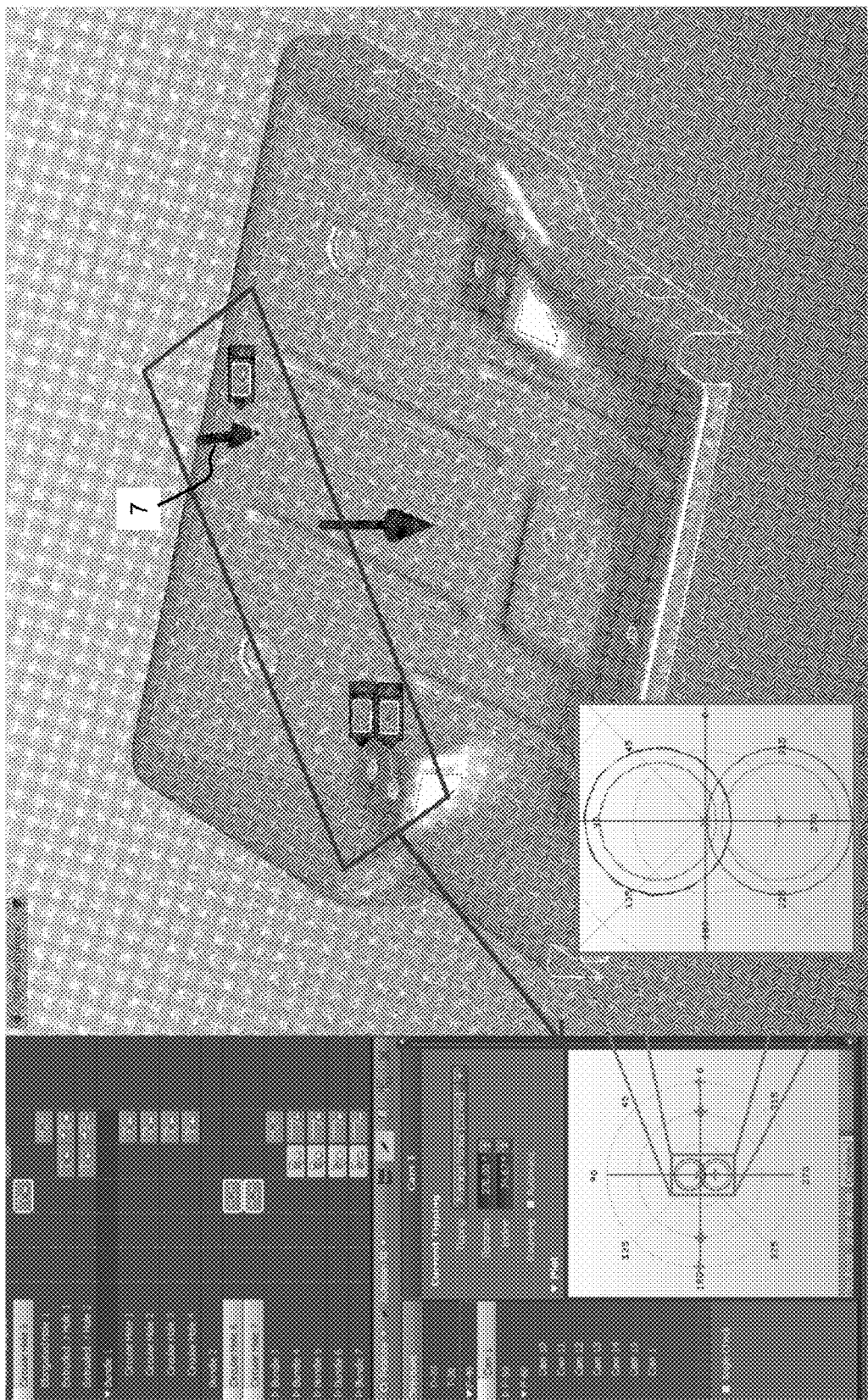
FIG. 5 shows, for a group of features, a graphical representation of working angles for manufacturing the features and of corresponding tolerances.

FIG. 5 shows, for a group of features, a graphical representation of working angles for manufacturing the features and of corresponding tolerances (The rectangular boxes and lines linking them are not part of the actual representation, but have been added for the purpose of illustration). In the upper left, three features are shown to be selected (circular hole 5, 6 and 7). On the representation of the part, only these features are shown (enclosed in a box, for illustration). In the lower left, a list of directions is shown, a direction being either the working direction of an upper die or the working direction of a cam. Cams can be listed in association with the dies they are part of. In the present example, the die for process operation F-40 has one cam, and the die for process operation F-60 has seven cams. To the right of this list of directions, a working angle plot is shown, with a central part magnified for illustration. The tipping angle plot has axes corresponding to a deviation of angles from a reference direction. The reference direction can be the working direction of the upper die of a particular process operation, or another direction defined relative to the part. In the present example, the working direction with reference numeral 7 is that of the cam named "Cam 1" selected in the list of directions. For each of the selected features, an inner boundary line is drawn that represents working directions under which the processing unit assigned to that feature can be applied while keeping the tolerances on the shape of the feature within a first limit. An outer boundary line corresponds to a second limit on the tolerances of the shape. In the present example, these boundary lines are circles. Two of the features have the same boundary lines, and so there remain four circles in the plot, in two concentric pairs. As can be seen, the inner boundaries do not intersect, and thus it is not possible to manufacture all features from the same working direction under the narrower tolerances. The outer boundary from one feature intersects the inner of the other, and so it is possible to manufacture the features with the same working direction if the tolerances on one of the features are relaxed to correspond to the second limit.

The user interface thus allows the user to select two or more features and processing units assigned to the features, and further to select a working direction (e.g. by selecting the direction of an upper die or a cam and thereby its working direction). The computer determines the working angle plot or another representation that indicates allowable working directions for the selected processing units. The computer then allows the user to select different working directions and to assign processing units to other tools, either within the same process operation or within another process operation. The tipping angle plot can be updated accordingly, allowing the user to iteratively find a solution, that is, assignment of each processing unit to an upper die or a cam, with which the processing units can be executed while ensuring the desired tolerances on the feature.

Figure 6:
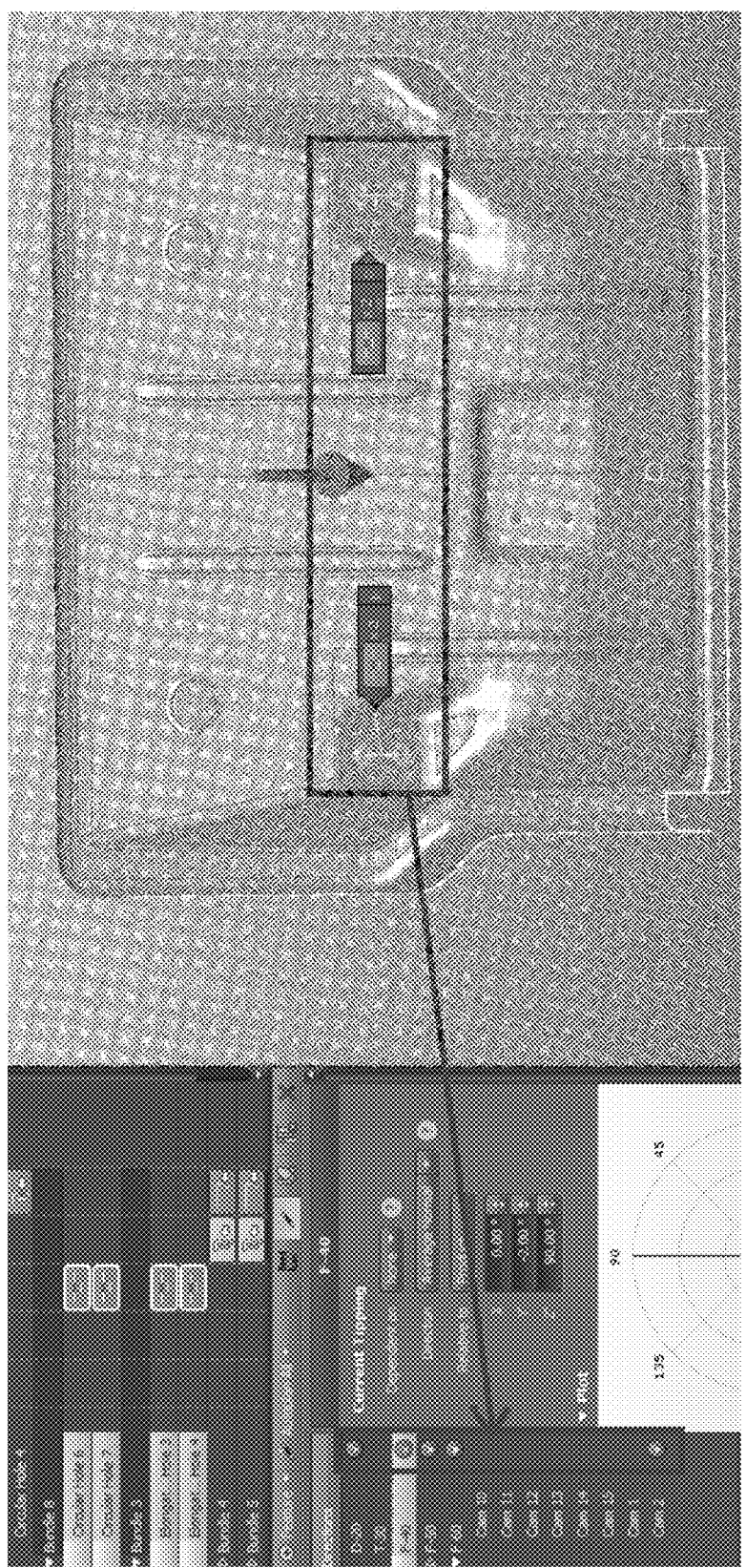
FIG. 6 shows selected features and an indication of working directions along which these features could be manufactured.

FIG. 6 shows a similar layout as FIG. 5, but with the selected features being Circular Hole 3, 4, 6, and 7, grouped into two pairs of holes (again, rectangular boxes and lines linking them have been added for the purpose of illustration). The list of directions shows a visual indication (in the present case, check marks) of those working directions along which these features could be manufactured, and thus also of corresponding tools. These visual indicators are determined automatically by the computer for each of the different working directions, from the directions of the features and from their tolerances.

Figure 7:
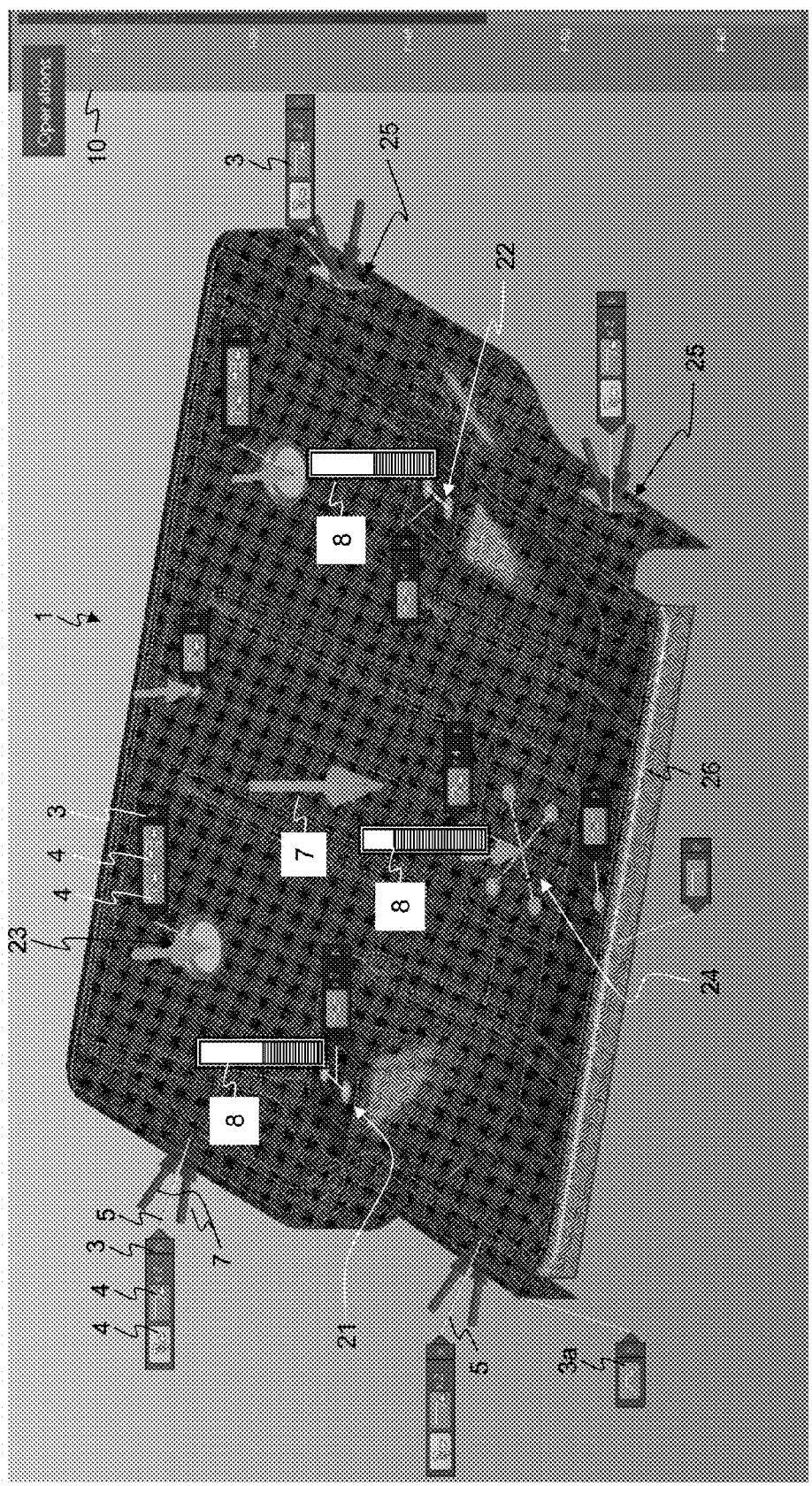
FIG. 7 is similar to FIG. 2, but also shows bars representing group press forces for some groups of features and a selected process operation.

FIG. 7 is similar to FIG. 2, but also shows bars 8 representing group press forces for some groups of features and a selected process operation. Such a representation allows for a quick graphic check on how the forces on the part and thus on the die are distributed. If the forces are unbalanced, the user can iteratively perform a redistribution of the processing units over the process operations.

FIG. 8 schematically shows a computer 100 on which the inventive method and system can be implemented: The computer 100 comprises a main unit 101, a keyboard 102 and a mouse 103 for user input, a loudspeaker 108 for auditory (sound) output, preferably for prompting the user, and a display screen 4 for displaying text and graphic information to the user. The main unit 101 comprises a data processing unit 105 such as a microprocessor, and a data storage unit 106 such as a hard disk or random-access-memory (volatile or non-volatile), and is preferably also configured to store data on and read data from a removable data storage device 107 such as a diskette, compact disc, memory stick or memory card, or on a remote storage unit (not shown). The abovementioned computer components may of course also be incorporated in a lap-top or handheld device.

While the invention has been described in present embodiments, it is distinctly understood that the invention is not limited thereto, but may be otherwise variously embodied and practiced within the scope of the claims.

The invention claimed is:

1. A method for designing a sheet-metal-forming process in which a sheet-metal part is formed, and for assisting a user in managing an assignment from processing units to process operations, the method performed by a processor of a computing system, the processor programmed to determine, from a model of the geometry of the sheet-metal part, a visual representation of the sheet-metal part, and to display this visual representation on a display device operatively coupled to the processor;

the processor programmed to maintain a computer based representation of process operations and processing units, wherein a process operation represents manufacturing steps effected on the part by one stroke of a forming press in a single station press or in one station of a multiple station press and wherein a processing unit represents one or more manufacturing steps that are assigned to one feature of the part and that are carried out in the same process operation;

the method comprising the steps of:

determining, by the processor, based on user input, one or more of the features as selected features;

computing, by the processor, feature markers indicating the location of the selected features on the sheet-metal part;

displaying, by the processor the feature markers on the display device;

computing, by the processor, one or more visual labels, a label being a visual representation of processing units that are assigned to the selected features, each label being visually assigned to the feature marker of the selected feature to which the label is assigned, creating an assignment; and displaying, by the processor, on the display device the one or more visual labels.

2. The method of claim 1, comprising the step of displaying connecting elements that visually connect the labels with the corresponding feature markers.

3. The method of claim 2, comprising the step of displaying the connecting elements as lines connecting the labels to the corresponding feature markers.

4. The method of claim 1, comprising the step of displaying at least one label as comprising one or more label elements, each label element corresponding to one of the processing units represented by the label.

5. The method of claim 4, the label elements being visually arranged according to the order of the processing units when manufacturing the part.

6. The method of claim 4, each label element comprising a symbolic or textual representation corresponding to one of the processing units represented by the label.

7. The method of claim 4, comprising the step of displaying on the label a visual representation of one or more process operations to which the one or more processing units represented by the label are assigned to, and a visual representation of the assignment.

8. The method of claim 7, comprising the step of displaying in addition, a visual representation of further process operations for manufacturing the part, to which further process operations the processing unit represented by the label is not assigned, and wherein label elements corresponding to processing units are placed to indicate which process operation each processing unit is assigned to.

9. The method of claim 7, comprising the step of displaying the visual representation of the process operations and one or more label elements in a grid arrangement, and wherein the visual representation of the process operations and the one or more label elements of processing units assigned to these process operations are placed in the same row or in the same column of the grid arrangement.

10. The method of claim 7, comprising the step of changing which process operation a processing unit is assigned to based on user input by the user graphically manipulating the label or graphically interacting with the label.

11. The method of claim 10, comprising the steps of, upon the user performing a drag and drop operation by dragging a label element corresponding to the processing unit to a screen location corresponding to the process operation to which the processing unit is to be assigned, and assigning the process unit to the process operation accordingly.

12. The method of claim 10, comprising the steps of, upon the user activating a context menu for a label element corresponding to the processing unit, the computer displaying in the context menu several indications of process operations, and, upon the user selecting one of these indications, assigning the process unit to the process operation according to the selection.

13. The method of claim 1, comprising the step of computing and displaying, for the one or more selected features, or for one or more processing units assigned to those features, a graphical or textual representation of evaluation criteria, the evaluation criteria being based on one or more of:
   working angles arising at the selected features, the working angles being defined relative to a given reference working direction assigned to the processing units that are required to manufacture the selected features;
   dimensional deviations with respect to given tolerances for the selected features, assuming that the feature is manufactured with a specific working direction;
   if at least one tool is defined, an indication whether a processing unit for the one or more selected features can be realized with the working direction of one of the tools that is already defined;
   for two or more selected features, distances between the selected features;
   for each of the selected features and for at least one of the process operations to which a processing unit for that feature is assigned, a required energy required for that processing unit;
   for each of the selected features and for at least one of the process operations to which a processing unit for that feature is assigned, a required press force required for that processing unit;
   a spatial distribution of required press forces in a process operation;
   a temporal distribution of required press forces in a process operation; and
   a tool cost for processing units assigned to the one or more selected features.

14. The method of claim 1, comprising the steps of
the processor, based on user input, determining two or more of the features to constitute a group of features;
the processor, based on user input, computing and displaying a label that is assigned to the group of features and comprises a visual representation of the set of the processing units that are assigned to all of the features of the group of features.

15. The method of claim 1, comprising the steps of
the processor, based on user input, determining two or more of the features to constitute a group of features;
the processor, based on user input, and for a process operation selected by the user, assigning the same tool to all of the processing units within the same process operation and assigned to said features.

16. The method of claim 1, comprising the steps of
the processor, based on user input, determining two or more of the features to constitute a group of features;
the processor, computing and displaying a working angle plot for the features of the group of features, the working angle plot being a visual representation of the working angles for the processing units within the same process operation and assigned to said features.

17. The method of claim 1, comprising the steps of
the processor, based on user input, determining two or more of the features to constitute a group of features;
the processor, computing and displaying one or more summary data items for the features of the group of features, a summary data item being a combination of parameters from these features or from the processing units assigned to said features.

18. The method of claim 1, comprising the steps of
the processor, based on user input, determining two or more of the features to constitute a group of features;
the processor, computing and displaying a group press force for the features of the group of features, the group press force being a sum of required press forces required for the processing units within the same process operation and assigned to said features.

19. The method of claim 1, comprising the step of computing and displaying, for the one or more selected features, a graphical or textual representation of a progress status assigned to the feature, the progress status indicating at least whether the feature needs to be worked on or not.

20. A non-transitory computer-readable medium comprising computer-executable instructions which, when executed by a processor of a computing system, cause the computing system to perform the method steps of claim 1.

21. A computing system programmed to perform the method steps of claim 1.

22. A method of manufacturing a non-transitory computer-readable medium, comprising the step of storing, on the computer-readable medium, computer-executable instructions which when executed by a processor of a computing system, cause the computing system to perform the method steps of claim 1.

* * * * *